Figure 4:
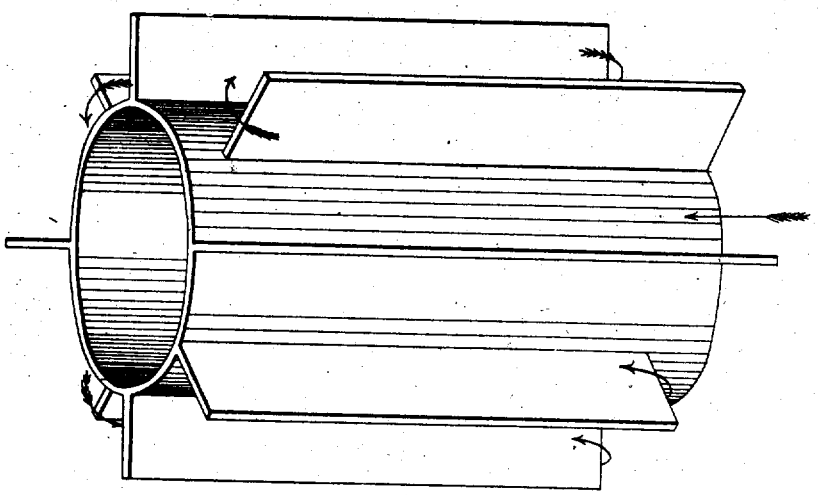

Sheet 1, 2 Sheets.
R. B. Varden.
Heating Stove.
No. 3564. Reissued Jul. 20, 1869.
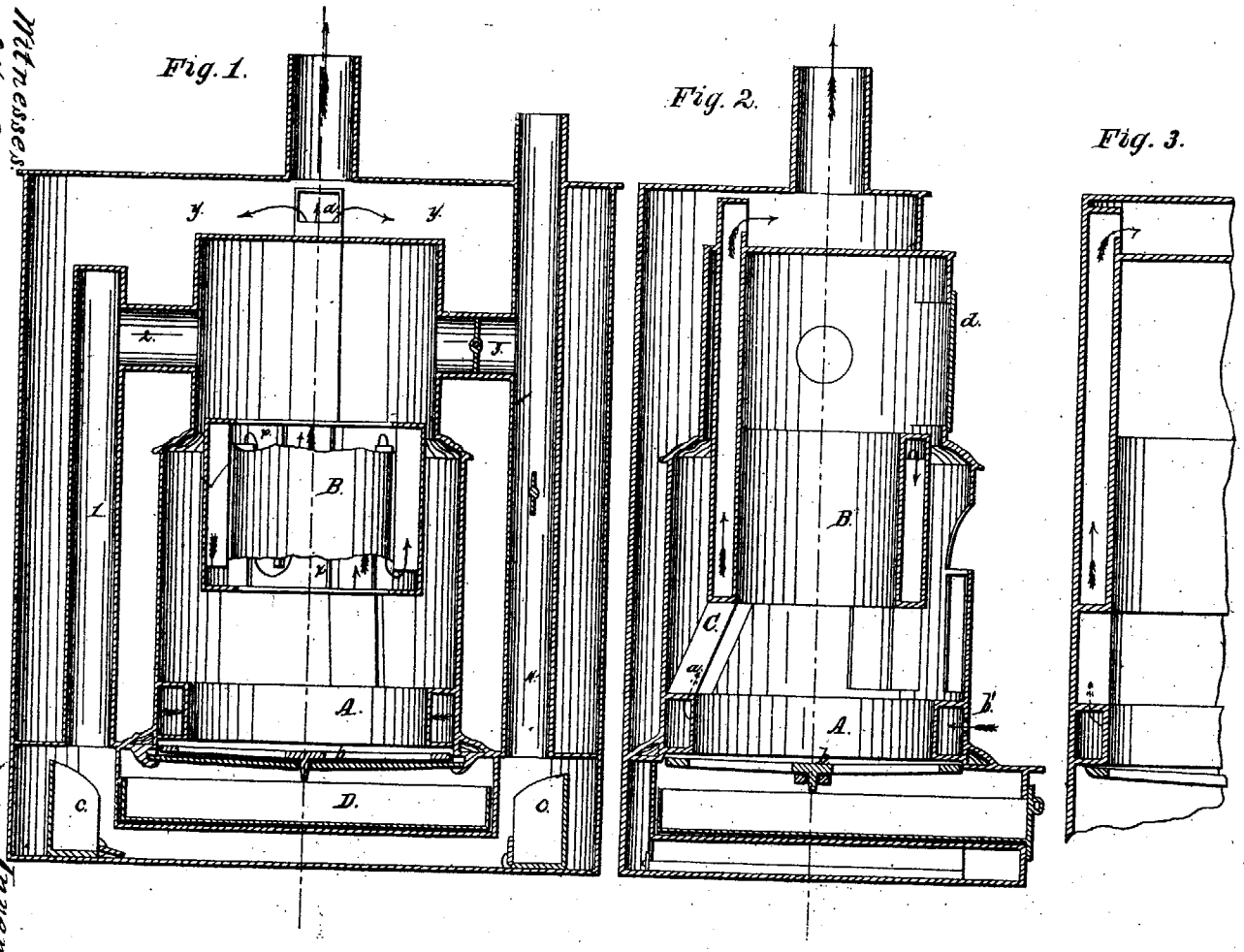
Witnesses:
E. W. Anderson.
James O. Evans
Inventor.
Robert B. Varden
Chipman, Hosmer & Co
attys Sheet 2, 2 Sheets.

R. B. Varden.

Heating Stove.

No. 3,564. Reissued Jul. 20, 1869.

Witnesses.
E. W. Anderson.
James P. Grimes

Inventor.
Robert B. Varden.
Chipman, Hosmer & C.
attys

UNITED STATES PATENT OFFICE.

'R. B. VARDEN, OF UNIONTOWN, MARYLAND.

COAL-STOVE.

Specification forming part of Letters Patent No. 91,186, dated June 8, 1869; Reissue No. 3,564, dated July 20, 1869.

*To all whom it may concern:*

Be it known that I, R. B. VARDEN, of Uniontown, in the county of Carroll and State of Maryland, have invented certain new and useful Devices in the Construction of Hot-Air Stoves; and I do hereby declare the following to be a full and sufficient description thereof, reference being had to the accompanying drawings and references, which make part of the specification.

My invention relates to means for economizing fuel; and it consists, mainly, in the construction and novel arrangement of an air-heating cylinder in such manner that the flame and products of combustion from a fire shall ascend both on the outside and inside of the same, and thereby secure the advantages of heating the air in said cylinder from two surfaces instead of one, as is usual in hot-air furnaces not constructed according to my plan.

The letter A of the drawings represents a short hollow cylinder set in the base of a stove having a suitable fire-grate arranged immediately under it. The grate and the inner periphery of A constitute the fire-box, and is at least a third larger than cylinder B, which is above it. Cylinder B is a third smaller, and twice as high as A. The center of cylinder B is directly over the center of A. The internal part of A is unobstructed with anything to impede the current of air passing through it. It has a door in front, *d*, and a discharge-opening behind from its top, as shown at C, but is of the same form as A, and leading from the upper part of fire-box A to the lower part of hot-air cylinder B in the rear. Cylinder B has its covering removed in front, as shown at *x x*, to expose the zigzag direction of the currents of hot air passing around it, as indicated by the red arrows.

The air enters the lower part of cylinder A at *b'*, and divides, one portion going to the right and the other to the left. They meet in the rear and ascend through a pipe shown at dotted lines *a*, and enter the hot-air space in cylinder B, and pass in zigzag current, as shown in the drawings, entirely around it, and escape through the exit-pipe *a* at the top, and are discharged at *a* into the hot-air chamber above the stove, as shown at *y*; or it is conducted in suitable pipes in any direction required.

The fire having been lighted in the fire-box A, the flame and products of combustion ascend over the inner and outer surfaces of the hot-air cylinder B, and, passing upward, escape through the smoke-pipe 2 and down through pipe 1, and so descend to the bottom of the stove through drawer *c*; thence into the ash-drawer D and drawer *c* and out through pipe 4 into the chimney, as indicated by the red arrows.

The short pipe 3 is kept closed by a damper while the stove is in operation; but while kindling the fire it is left open to allow of the direct escape of the smoke.

Immediatel under the vertical smoke-pipes 1 and 4 are the drawers *c c*, having the inner side of each hinged to drop down on the bottom, where they rest during the time that the stove is in operation for the purpose of aiding in controlling the draft of the fire on the one hand and receiving the soot and dirt from the smoke-pipes on the other.

Drawer D, under the center of the stove, is for receiving the ashes falling from the grate and allowing air-passage for feeding combustion.

The advantage of this air-heating stove over other hot-air stoves is that the air-heater B is heated both on the inner and outer surfaces at the same time, while other hot-air stoves are heated from one fire-surface only.

The novelty of the drawers *c* is that they perform the double function of being a soot-receptacle and controlling the draft at the same time.

On the drawings, the aperture for conducting the air into the lower end of the cylinder is shown at *b*. I am not confined in my device to this particular opening at this particular place, as my apparatus will work with equal perfection in case I admit the air at some other point or points. Indeed, it is often desirable to admit the air from the outside of the building by a pipe leading directly to the bottom of the cylinder.

Figure 3:
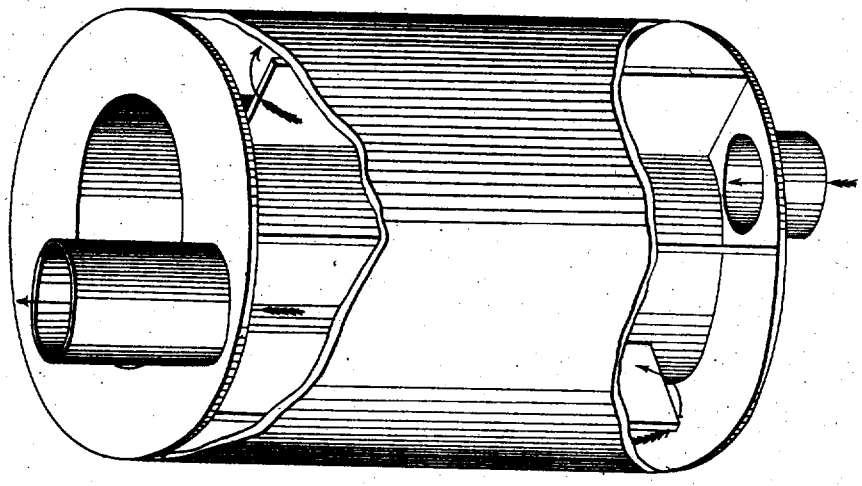

Figure 3 of the drawings represents my cylinder when constructed with one fire-surface only.

The proportions mentioned in this specification for the guidance of manufacturers in constructing my apparatus constitute no part of my invention, nor are they intended as infallible guides in such manufacture. I frequently construct the cylinder of great length, comparatively, in order to increase the circuit of the heating-air. Neither do I wish to confine myself to the zigzag direction given to the air in the cylinder, as a spiral or free course for such air may be made to subserve a good purpose.

My device, as represented on the drawings, shows a heating apparatus in the form of a coal-stove. I do not wish to confine my patent to that specific heating apparatus, as my device is applicable to furnaces generally for the production of heat and open fire-places. When applied to furnaces, the cylinder should be constructed very broad.

I sometimes construct my cylinder with one fire-surface only. In that case it is less efficient than when formed as specified above, but it has still many advantages over the ordinary methods of producing heat.

My main invention consists in the cylinder, as described, and its application to the uses for which it is adapted. The manufacturer must be governed by the necessities of the case as to its size and proportions.

Fire-brick and soapstone may be sometimes advantageously used in the construction of a portion of this cylinder, and particularly of that portion which lies adjacent to the fire.

What I claim as my invention, and desire to secure by Letters Patent, is—

1. The arrangement and construction of the air-heating chamber in such manner that while A acts as a fire-box and air-heater, B shall be enveloped by flame and products of combustion through its axis and on its outer periphery, substantially in the manner and for the purpose set forth.

2. The air-heating cylinder B, when constructed and arranged to operate substantially as and for the purposes herein specified.

June 18, 1869.

R. B. VARDEN.

Witnesses:

JAMES P. GREVES,
A. G. HEYLMUN.